US012549405B2

(12) United States Patent
Scheckelhoff et al.

(10) Patent No.: US 12,549,405 B2
(45) Date of Patent: Feb. 10, 2026

(54) SYSTEM AND METHOD FOR OPERATING A PLURALITY OF APPLIANCES

(71) Applicant: Haier US Appliance Solutions, Inc., Wilmington, DE (US)

(72) Inventors: Ryan James Scheckelhoff, Louisville, KY (US); Joshua Reeves, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 613 days.

(21) Appl. No.: 17/986,705

(22) Filed: Nov. 14, 2022

(65) Prior Publication Data

US 2024/0163132 A1 May 16, 2024

(51) Int. Cl.
*H04L 12/28* (2006.01)

(52) U.S. Cl.
CPC ...... *H04L 12/2818* (2013.01); *H04L 12/2814* (2013.01); *H04L 12/2821* (2013.01); *H04L 12/2838* (2013.01)

(58) Field of Classification Search
CPC .............. H04L 12/2818; H04L 12/2828
USPC ............................................. 709/224
See application file for complete search history.

(56) References Cited

U.S. PATENT DOCUMENTS

| 10,275,746 | B1* | 4/2019 | Breitman .............. H04L 67/306 |
| 11,098,430 | B2 | 8/2021 | Belveal et al. |
| 2017/0085390 | A1* | 3/2017 | Belveal ................... D06F 35/00 |
| 2018/0253719 | A1* | 9/2018 | Urquhart ................ G07F 17/20 |
| 2019/0109723 | A1* | 4/2019 | Ebrom .................. H05B 6/688 |

FOREIGN PATENT DOCUMENTS

| JP | 2005202580 A | 7/2005 |
| JP | 2018077596 A | 5/2018 |
| JP | 6590435 B1 | 10/2019 |
| TW | M512037 U | 11/2015 |

* cited by examiner

*Primary Examiner* — Sibte H Bukhari
(74) *Attorney, Agent, or Firm* — Dority & Manning, P.A.

(57) ABSTRACT

An appliance, system, and method for operating laundry appliances are provided. The method includes generating a plurality of utilization signals including a utilization rate corresponding to a first plurality of appliances at a first location; determining an activity status based on the plurality of utilization signals of the first plurality of appliances at the first location; determining a demand status based on comparing the activity status to a quantity of user interface devices within range of a network; and generating a user control signal based on the demand status. The user control signal corresponds to a second plurality of appliances at a second location.

17 Claims, 4 Drawing Sheets

SYSTEM AND METHOD FOR OPERATING A PLURALITY OF APPLIANCES

FIELD

The present subject matter relates generally to appliances and methods for operation of appliances.

BACKGROUND

Washing and drying appliances at a location, such as a laundromat, dormitory, or housing complex, are utilized by numerous users for washing and drying. Users generally utilize the appliance based on availability. Availability may vary based on the positioning of the appliance at the location, such as being more or less accessible or visible from an entrance, or other factors that may cause some appliances to be utilized more or less often than appliances at the same location. Furthermore, appliances across multiple locations may experience varying availability, such as accessibility or visibility at a location (e.g., one laundromat versus another laundromat).

However, an owner or operator of multiple appliances, such as at one or more locations, may experience unevenly distributed rates of utilization, wear, or deterioration at the appliances, such as due to users favoring or using certain appliances versus other appliances. Uneven wear may require irregular maintenance or repair, or require physically re-arranging certain appliances to have more even utilization of the appliances. However, physically re-arranging appliances is cumbersome and may be cost-prohibitive to perform. Irregular maintenance and repair may increase the cost of operating appliances at one or more locations, such as at laundromats, dormitories, or housing complexes.

Accordingly, systems and methods for controlling load distribution across multiple appliances is desired and would be advantageous.

BRIEF DESCRIPTION

Aspects and advantages of the invention will be set forth in part in the following description, or may be obvious from the description, or may be learned through practice of the invention.

An aspect of the present disclosure is directed to a computer-implemented method for operating pluralities of appliances. The method includes generating a plurality of utilization signals including a utilization rate corresponding to a first plurality of appliances at a first location; determining an activity status based on the plurality of utilization signals of the first plurality of appliances at the first location; determining a demand status based on comparing the activity status to a quantity of user interface devices within range of a network; and generating a user control signal based on the demand status, wherein the user control signal corresponds to a second plurality of appliances at a second location.

Yet another aspect of the present disclosure is directed to a system of appliances. The system includes a first plurality of appliances at a first location, a second plurality of appliances at a second location, and a controller configured to execute operations. The operations include generating, at the first plurality of appliances, a plurality of utilization signals including a utilization rate corresponding to the first plurality of appliances; determining an activity status based on the plurality of utilization signals of the first plurality of appliances; determining a demand status based on comparing the activity status to a quantity of user interface devices within range of a network; and generating a user control signal based on the demand status.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
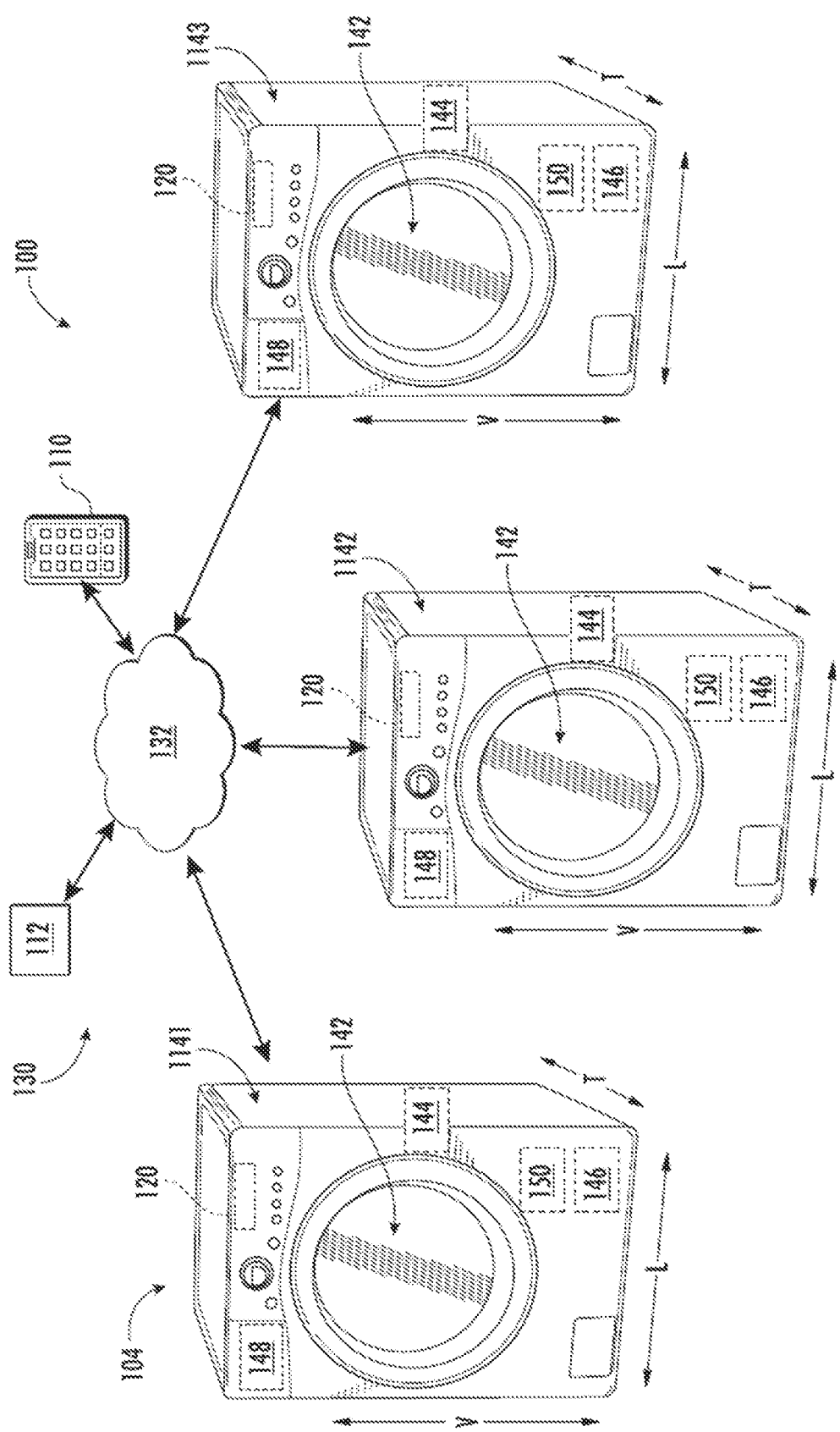
FIG. 1 provides a schematic embodiment of a system for operating a plurality of appliances in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Figure 2:
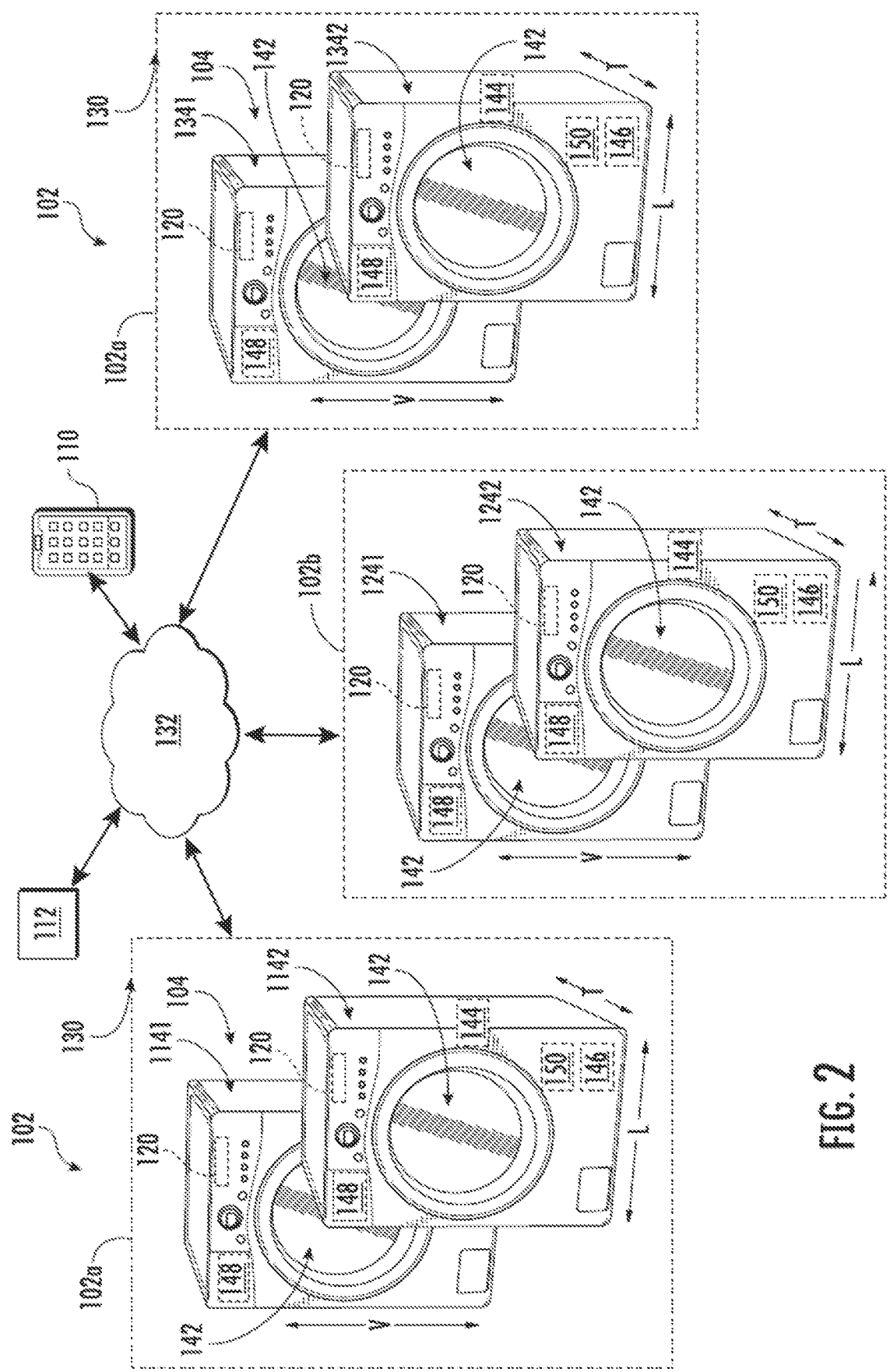
FIG. 2 provides a schematic embodiment of a system for operating a plurality of appliances in accordance with aspects of the present disclosure.

Referring now to FIG. 1, a system for operating a plurality of appliances (hereinafter, "system 100") will be described according to exemplary embodiments of the present subject matter. In general, the system 100 may include any suitable number, type, and configuration of laundry appliances 104 such as described herein, remote servers, network devices, and/or other external devices. The system 100 may form a computing network including two or more appliances 104 at a location. The appliances 104 are configured to communicate through a cloud computing network 132. Two or more appliances 104 may be configured to communicate with each other directly, or through the network 132, or are otherwise interconnected. As depicted in FIGS. 1-2, appliance 104 may form a laundry washing appliance or laundry drying appliance, or combinations thereof. Details regarding the components and operation of appliances 104 may be understood by one having ordinary skill in the art and further detailed discussion is omitted herein for brevity. However, it should be appreciated that the specific appliance types and configurations are only exemplary and are provided to facilitate discussion regarding the use and operation of an exemplary system 100 for one or more appliances such as described herein. The scope of the present subject matter is not limited to the specific number, type, and configurations of appliances set forth herein.

Referring to FIG. 2, the system 100 includes a plurality of appliances 104 that may be located together at a location 102, such as a laundromat, a housing complex, a dormitory, etc. In some embodiments, the system 100 may include a plurality of locations 102 of appliances 104 (e.g., location 102a, 102b, 102c, etc.), such as a plurality of appliances 104 each located at respective locations 102, such as a plurality of laundromats, housing complexes, dormitories, etc.

FIGS. 1-2 illustrate the system 100 according to exemplary embodiments of the present subject matter. As shown, the system 100 generally includes two or more appliances 104, such as may be configured to circulate, re-circulate, drain or otherwise move fluid (e.g., water, wash fluid, detergent, water-detergent mixture, etc.) into, through, and out of a wash chamber, or to dry articles within a drying chamber.

As schematically depicted in FIGS. 1-2, appliance 104 may include a laundry chamber 142 at which articles (e.g., laundry articles, clothing, etc.) may be washed, steamed, or dried, such as may be understood in the art. As further understood in the art, appliance 104 may include any appropriate flow device 144 configured to provide, dispense, agitate, eject, spray, distribute, or otherwise move fluid into or through the laundry chamber 142. Various embodiments of the flow device 144 may include flow nozzles, valves, rotatable vanes or blades, agitators, or other appropriate flow structures. Various embodiments of appliance 104 may include a pump 146 or other device allowing or promoting flow, or pressurized flow, of fluid into, through, or out of the laundry chamber 142. It should be appreciated that "fluid", as provided herein, includes water, water-detergent mixture, detergent, cleaning solution, steam, hot dry air, ambient temperature air, or combinations thereof, or aerated combinations thereof including a gaseous fluid (e.g., air) mixed therewith.

In certain embodiments, appliance 104 may include a dispensing device 148 configured to hold and selectively dispense a quantity of liquid, solid (e.g., powder), or gel detergent, cleaning medium, scent, or perfume. In particular embodiments, dispensing device 148 is configured to hold quantities of medium appropriate for multiple cycles. In still further embodiments, dispensing device 148 is operably coupled to a controller 120 and configured to dispense, or otherwise allow for mixtures with water, various amounts of medium based on a plurality of operating modes or control signals, or air.

Appliance 104 includes one or more sensors 150 configured to measure, calculate, or otherwise determine a utilization rate of each appliance 104. The utilization rate may include run time or operation time (e.g., a lifetime amount of time in minutes, hours, days, weeks, etc. the appliance has run, an amount of time since a maintenance period, etc.), cycle count (e.g., a lifetime quantity of cycles, a quantity of wash or dry cycles since a maintenance period, etc.), or an operation time or cycle count within a period of time (e.g., operation time per day, operation time per week, cycles per day, cycles per week, etc.), or accumulations of two or more operation times or cycle counts. In some embodiments, sensor 150 may further determine the utilization rate and a load type. The sensor 150 may determine the utilization rate including a coefficient corresponding to a type of wash or dry cycle run. For instance, the utilization rate may include a coefficient that increases the utilization rate based on a user running heavier or longer-duration loads or decreases the utilization rate based on the user running lighter or shorter-duration loads. As further described herein, appliance 104, such as via sensor 150, controller 120, or device 110 may be configured to transmit a utilization signal corresponding to the utilization rate.

In certain embodiments, system 100 may include one or more external devices, e.g., devices that are separate from or external to the one or more appliances 104, and which may be configured for facilitating communications with various appliances or other devices. For example, the system 100 may include or be communicatively coupled with a remote user interface device 110 that may be configured to allow user interaction with some or all appliances 104 or other devices in the system 100.

In general, remote user interface device 110 may be any suitable device separate and apart from appliances 104 that is configured to provide or receive communications, information, data, or commands from a user, such as further described herein. In this regard, remote user interface device 110 may be an additional user interface to the user interface panels of the various appliances within the system 100. In this regard, for example, the user interface device 110 may be a personal phone, a smartphone, a tablet, a laptop or personal computer, a wearable device, a smart home system, or another mobile or remote device. For example, the separate device may be a smartphone operable to store and run applications, also known as "apps," and the user interface device 110 be provided as a smartphone app.

In still particular embodiments, user interface device 110 may be affixed to or form a part of another appliance (e.g., refrigeration appliance), such as may provide for centralized communication among a plurality of appliances including one or more of appliances 104. Appliances to which user interface device 110 is operably coupled may be configured substantially similarly as a personal phone, a smartphone, a tablet, a laptop or personal computer, a wearable device, a smart home system, or another mobile or remote device.

As will be described in more detail below, some or all of the system 100 may include or be communicatively coupled with a database storage device or remote server 112 that may be in operative communication with some or all appliances within system 100. Thus, in certain embodiments, user interface device 110 and/or remote server 112 may refer to one or more devices that are not considered laundry appliances as used herein. In addition, devices such as a personal computer, router, network devices, and other similar devices whose primary functions are network communication and/or data processing are not considered laundry appliances as used herein.

As illustrated, each of appliance 104, user interface device 110, or any other devices or appliances in system 100 may include or be operably coupled to a controller 120. Controller 120 is configured to regulate, allow, or inhibit operation at appliance 104, such as further described herein. The controller 120 may be positioned in a variety of locations throughout appliance 104 (e.g., a control panel area, at a door, etc.). In some embodiments, input/output ("I/O") signals are routed between controller 120 and various operational components of appliance 104 along wiring harnesses that may be routed, e.g., through the bottom of a door. Controller 120 may include a user interface panel through which a user may select various operational features and operating modes and monitor progress of the appliance 104. The user interface may represent a general purpose I/O ("GPIO") device or functional block. Additionally, the user interface may include input components, such as one or more of a variety of electrical, mechanical, or electro-mechanical input devices including rotary dials, push buttons, and touch pads. The user interface may also include a display component, such as a digital or analog display device designed to provide operational feedback to a user. The user interface may be in communication with the controller 120 via one or more signal lines or shared communication busses.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120, user interface device 110, and remote server 112 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors. Executed instructions cause the system 100, or the appliances 104, remote server 112, or user interface device 110 in particular, to perform operations, such as one or more steps of method 1000 provided further herein.

For example, controller 120 may be operable to execute programming instructions or micro-control code associated with an operating cycle or operating mode of appliance 104. In this regard, the instructions may be software or any set of instructions that when executed by the processing device, cause the processing device to perform operations, such as running one or more software applications, displaying a user interface, receiving user input signals, processing user input signals, pr permitting or disabling operation of the appliance 104.

Moreover, it should be noted that controller 120 as disclosed herein is additionally, or alternatively, configured to transmit signals, store, execute, or otherwise operate or perform any one or more methods, method steps, or portions of methods as disclosed herein. For example, in some embodiments, methods disclosed herein may be embodied in programming instructions stored in the memory at one or more of controller 120, user interface device 110, or remote server 112, and executed by controller 120, user interface device 110, or remote server 112. The memory devices may also store data that can be retrieved, manipulated, created, or stored by the one or more processors or portions of controller 120. One or more database(s) can be connected to controller 120 through any suitable communication module, communication lines, or network(s) (e.g., computing network 132). Such databases, as further described herein, are stored at one or more of controller 120, user interface device 110, remote server 112.

Referring still to FIGS. 1-2, a schematic diagram of an external communication system 130 will be described according to an exemplary embodiment of the present subject matter. In general, external communication system 130 is configured for permitting interaction, data transfer, and other communications between and among one or more of the appliances 104 user interface device 110, and the remote server 112. For example, this communication may be used to transmit packets of data or datasets through a network 132 and to the remote server 112 and to receive at one or more appliances 104 one or more control signals, user signals, location signals, permissive signals, inhibit signals, or pricing signals, such as further described herein.

In addition, remote server 112 may be in communication with the appliance 104 and/or user interface device 110 through the network 132. In this regard, for example, remote server 112 may be a cloud-based server 112, and is thus located at a distant location, such as in a separate region, state, country, etc. According to an exemplary embodiment, user interface device 110 may communicate with a remote server 112 over network 132, such as the Internet, to transmit/receive signals, data packets or information, datasets, provide user inputs, receive user notifications or instructions, access databases, interact with or control the appliance 104, etc. In addition, user interface device 110 and server 112 may communicate with the appliance 104 to communicate similar information.

In general, communication between the appliance 104, user interface device 110, server 112, and/or other user devices or appliances may be carried using any type of wired or wireless connection and using any suitable type of communication network, non-limiting examples of which are provided below. For example, user interface device 110 may be in direct or indirect communication with the appliance 104 through any suitable wired or wireless communication connections or interfaces, such as network 132. For example, network 132 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

Communication system 130 is described herein according to an exemplary embodiment of the present subject matter. However, it should be appreciated that the exemplary functions and configurations of communication system 130 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Embodiments of the system 100 are configured to control a rate of usage, wear, or deterioration at the appliance 104. Embodiments of the system 100 may furthermore be configured to level-load the rate of usage, wear, or deterioration across the plurality of appliances 104 at a location 102 (e.g., FIG. 1), or the plurality of appliances 104 across the plurality of locations 102 (e.g., FIG. 2). In certain embodiments, the system 100 is configured to promote increased usage at certain appliances 104 (e.g., under-utilized appliances), to decrease usage at certain appliances 104 (e.g., over-utilized appliances), or promote increased or decreased usage at certain locations 102 (e.g., under-utilized or over-utilized locations 102a, 102b, 102c of pluralities of appliances). Accordingly, selective promotion of increased or decreased utilization of appliances 104 and/or locations 102 may level-load the rate of usage, wear, or deterioration across the plurality of appliances 104. Such level-loading may increase durability of each appliance 104, or increase durability of the plurality of appliances 104, or allow for coordinated maintenance or down-time of the plurality of appliances 104, or portions of the plurality of appliances 104.

Figure 3:
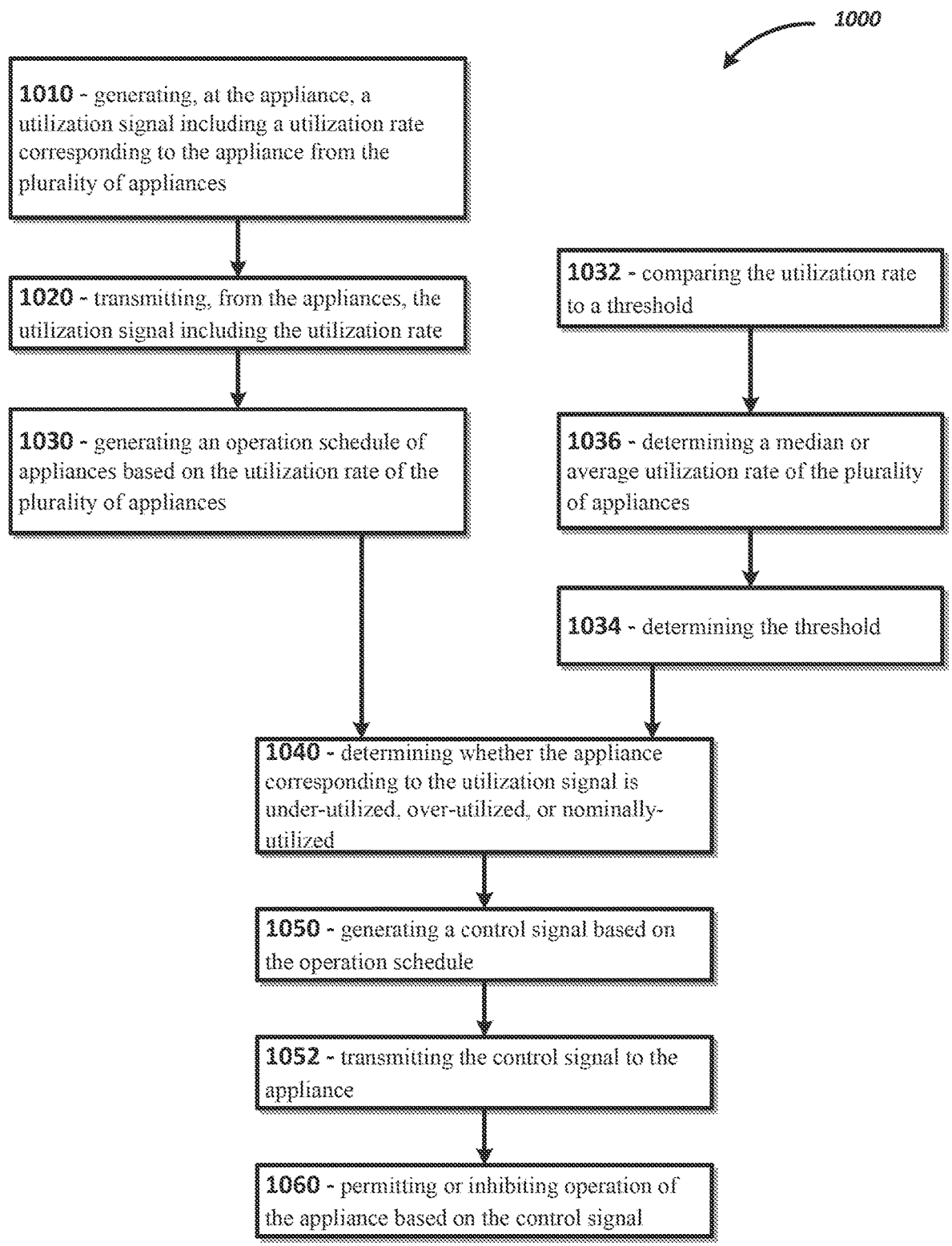
FIG. 3 provides a flowchart outlining steps of a method for operating an appliance in accordance with aspects of the present disclosure.
Figure 4:
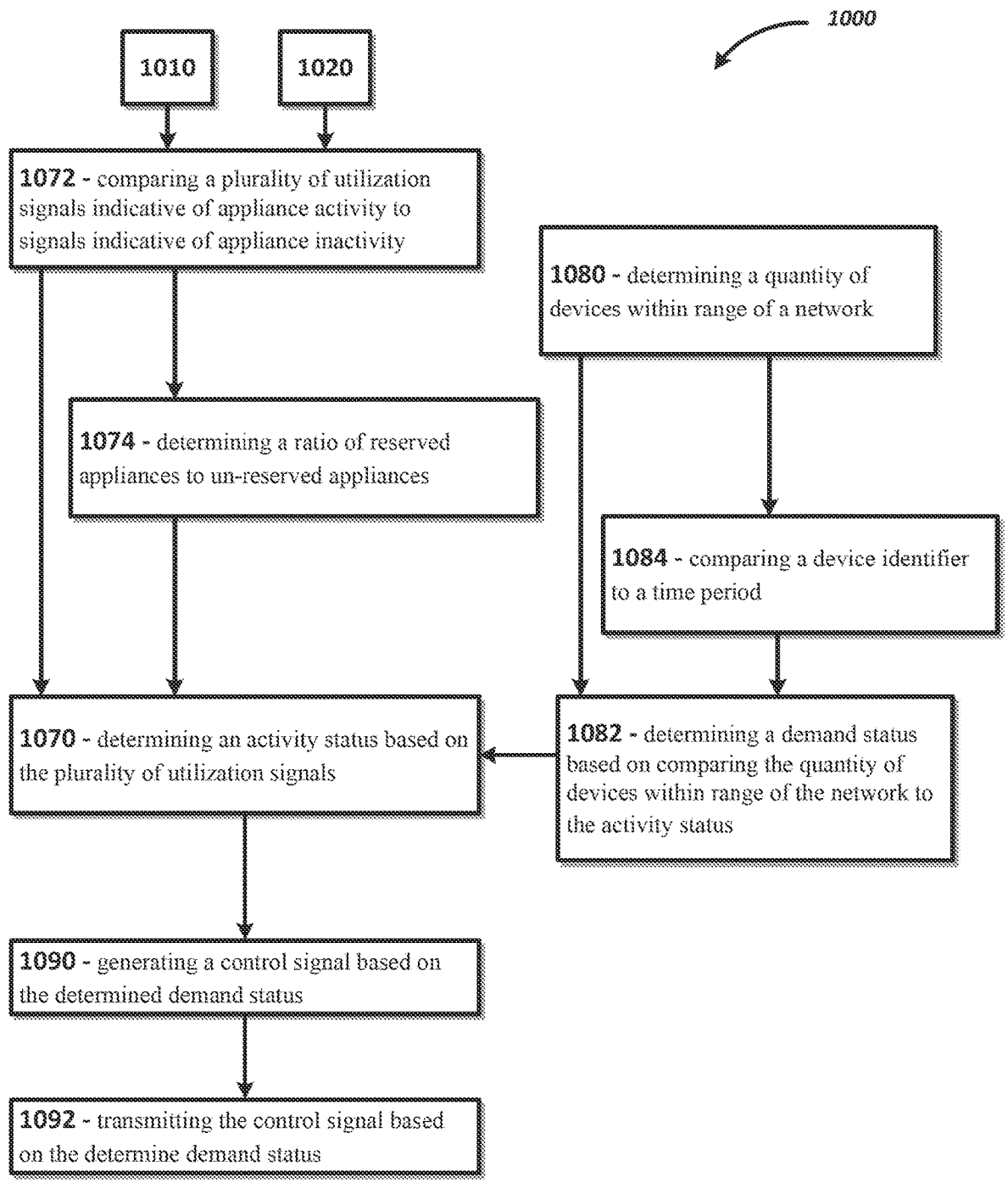
FIG. 4 provides a flowchart outlining steps of a method for operating an appliance in accordance with aspects of the present disclosure.

Referring now to FIGS. 3-4, flowcharts outlining exemplary steps of a method for operating an appliance are provided (hereinafter, "method 1000"). Embodiments of the method 1000 may provide a method for load distribution, utilization distribution, or level loading across a plurality of appliances, such as a plurality of washing appliances or dryer appliances at one or more locations such as described herein. Embodiments of the method 1000 may improve durability and mitigate excessive deterioration by evening usage and wear across a plurality of appliances, or across a plurality of locations of pluralities of appliances.

The method 1000 includes at 1010 generating, at the appliance, a utilization signal including a utilization rate corresponding to the appliance from the plurality of appliances. Generating the utilization signal, and the corresponding utilization rate, may be respective to each appliance. In various embodiments, the method 1000 at 1010 includes generating a plurality of utilization signals each corresponding to respective appliances of the plurality of appliances.

Embodiments of the method 1000 include at 1020 transmitting, from the appliances, the utilization signal including the utilization rate. In various embodiments, transmitting the utilization signal includes transmitting the utilization signal from a respective appliance of the plurality of appliances. In still various embodiments, the method 1000 includes transmitting the utilization signal from the appliance to the computing network (e.g., network 132). The method 1000 may include obtaining, via a user interface device (e.g., device 110) or remote server (e.g., server 112), the utilization signal.

The method 1000 includes at 1030 generating an operation schedule of appliances based on the utilization rate of the plurality of appliances. In some embodiments, the method 1000 at 1030 includes determining, at the remote server (e.g., server 112) or user interface device (e.g., device 110), the operation schedule of appliances. Determining the operation schedule may include at 1032 comparing the utilization rate to a threshold, such as a utilization threshold, a wear threshold, or other threshold corresponding to usage, wear, or deterioration, or rates thereof, at the appliance. In some embodiments, the method 1000 includes at 1034 determining the threshold. For instance, determining the threshold may include determining a baseline utilization rate. Determining the baseline utilization rate may include at 1036 determining a median or average utilization rate of the plurality of appliances. Determining the baseline utilization rate for the plurality of appliances may correspond to a location (e.g., location 102), or correspond to pluralities of appliances at pluralities of locations (e.g., location 102a, 102b, 102c, etc.).

The method 1000 may include at 1040 determining whether the appliance corresponding to the utilization signal is under-utilized, over-utilized, or nominally-utilized. In various embodiments, the method 1000 at 1040 includes comparing the utilization signal to the threshold. The threshold may include a range or deviation from a baseline, median, or nominal value, such as a percentage difference, statistical or standard deviation, preset value or range, etc. Utilization rates above, below, or within the threshold may correspond to whether the appliance is under-utilized, over-utilized, or nominally-utilized.

In various embodiments, the method 1000 includes at 1050 generating a control signal based on the operation schedule. In some embodiments, the method 1000 includes generating, at the remote server or the user interface device, the control signal.

In various embodiments, the method 1000 at 1050 includes generating a plurality of control signals each corresponding to respective appliances of the plurality of appliances based on the operation schedule. In some embodiments, method 1000 includes at 1052 transmitting the control signal, or plurality thereof, such as through a cloud computing network (e.g., network 132), or from the remote server or user interface device. In certain embodiments, the method 1000 at 1052 includes transmitting the control signal to the appliance. In still particular embodiments, transmitting the control signal includes transmitting a control signal respective to the appliance that transmitted the utilization signal.

In one embodiment, the control signal includes a permissive or inhibit signal, such as to allow or disable operation of the appliance (e.g., to promote increased or decreased usage of the appliance based on utilization rate). In another embodiment, the control signal includes a pricing signal, such as to modify a user cost for operating the appliance (e.g., to provide a discount to operate a particular appliance in contrast to another, such as to promote increased usage of the appliance or decreased usage of other appliances).

In various embodiments, the control signal may include directing the user to an appliance at a different location, such as another plurality of appliances. For instance, the control signal may permit operation of the appliance at a particular location (e.g., another plurality of appliances), or decrease the user cost at a particular location, such as to direct users from one location to another location.

In still another embodiment, the control signal may include directing a user to a particular appliance based on the utilization rate. For instance, the operation schedule may generate a priority schedule of the plurality of appliances. The priority schedule may arrange each appliance of the plurality of appliances into an order of operation based on a ranking of utilization rates. The ranking of utilization rates may prioritize increasing usage of under-utilized appliances (e.g., higher ranking) or decreasing usage of over-utilized appliances (e.g., lower ranking). In some embodiments, the ranking of utilization rates may prioritize increasing usage of over-utilized appliances or decreasing usage of under-utilized appliances. The ranking of utilization rates may include a serial order at which the plurality of appliances should operate. The control signal may direct the user to the next appliance to be operated based accordingly on the priority schedule.

In some embodiments, the user is directed to the appliance, such as via the control signal received at the user interface device (e.g., device 110) of the user. In still some embodiments, the appliance may be configured to generate and transmit a sensory signal, such as configured to emit an audio signal (e.g., noise, chime, music, sound, oral message, etc.) or visual signal (e.g., visual message, light, such as flashing, blinking, or strobing light, etc.). The sensory signal is configured to direct the user to the appliance to be utilized such as described herein. In certain embodiments, the controller 120 at the appliance includes a display component, a speaker or sound component, or other device configured to emit an audio or visual signal.

Various embodiments of the method 1000 include at 1060 permitting or inhibiting operation of each appliance of the plurality of appliances based on the control signal.

Exemplary embodiments of the system 100 are configured to store, execute, or otherwise perform steps of embodiments of the method 1000, such as to cause the system to perform operations. Referring to FIG. 1, in an exemplary embodiment of the method 1000 executed by an embodiment of the system 100, the system 100 is configured to generate and transmit, from a first appliance 1141, a first utilization signal having a first utilization rate approximately at a baseline value; generate and transmit, from a second appliance 1142, a second utilization signal having a second utilization rate below the threshold (e.g., under-utilized); and generate and transmit, from a third appliance 1143, a third utilization signal having a third utilization rate over the threshold (e.g., over-utilized).

The system 100 determines, such as at the remote server 112 or user interface device 110, an operation schedule of appliances based on the plurality of utilization rates obtained from the plurality of appliances 1141, 1142, 1143. The system 100 may compare the utilization rate to a threshold, such as to determine whether each appliance is under-utilized, over-utilized, or nominally or average-utilized, such as based on respective utilization rates. The system 100 may determine the first appliance 1141 is nominally utilized, the second appliance 1142 is under-utilized, and the third appliance 1143 is over-utilized, based on the utilization signal obtained from each appliance 1141, 1142, 1143. The system 100 may determine and generate the operation schedule based on the plurality of utilization rates compared to the threshold. The operation schedule may include an order of operation including the second appliance 1142 to be used sooner or more often than the first appliance 1141, the first appliance 1141 to be used sooner or more often than the third appliance 1143.

The system 100 generates and transmits control signals to each appliance 1141, 1142, 1143 based on the operation schedule. For instance, the system 100 may generate and transmit a first control signal corresponding to the first appliance 1141, a second control signal corresponding to the second appliance 1142, and a third control signal corresponding to the third appliance 1143.

In one embodiment, the second control signal may be a permissive signal, such as to permit utilization of the second appliance 1142. The first control signal and the third control signal may be an inhibit signal, such as to disable utilization of the first appliance 1141 and the third appliance 1143. In some embodiments, another first control signal may be generated and transmitted, such as after utilization of the second appliance 1142, such as to permit utilization of the first appliance after utilization of the second appliance 1142. In still some embodiments, another third control signal may be generated and transmitted, such as after utilization of the first appliance 1141, such as to permit utilization of the third appliance after utilization of the first appliance 1141.

In another embodiment, the second control signal may be a pricing signal, such as to permit utilization of the second appliance 1142 at a lower user cost compared to the first appliance or the third appliance. The lower user cost may promote utilization of the second appliance 1142 before the first appliance 1141 and the third appliance 1143. In still another embodiment, the first control signal may be a pricing signal, such as to permit utilization of the first appliance 1141 at a lower user cost compared to the third appliance 1143, and at a greater user cost compared to the second appliance 1142. Accordingly, the pricing signal may promote utilization of the second appliance 1142 before the first appliance 1141, and promote utilization of the first appliance 1141 before the third appliance 1143.

In some embodiments, the method 1000 at 1052 includes transmitting the control signal as a user control signal to the user interface device 110. The user interface device 110 may direct the user to the desired appliance 104, such as appliance 1142 described in the exemplary embodiment above.

Referring to FIG. 2, the system 100 may include a plurality of locations 102a, 102b, 102c. In one embodiment, the control signal may include a first control signal corresponding to a first location 102a, a second control signal corresponding to a second location 102b, and a third control signal corresponding to a third location 102c, etc. The control signal may promote utilization of appliances at one location versus another, such as via generating and transmitting control signals corresponding to respective locations 102*a*, 102*b*, 102*c*, etc.

In still further embodiments, the control signal may correspond to a particular appliance and a particular location. For instance, the system 100 may include a first appliance 1141 at a first location 102*a*, a second appliance 1142 at the first location 102*a*, etc., and a first appliance 1241 at a second location 102*b*, a second appliance 1242 at the second location 102*b*, etc., and a first appliance 1341 at a third location 102*c*, a second appliance 1342 at the third location 102*c*, etc. The control signal may promote utilization of, e.g., the first appliance 1241 at the second location 102*b*, such as via permissive or inhibit signals or pricing signals such as described above.

In various embodiments, the method 1000 at 1052 includes transmitting a user control signal to the device (e.g., user interface device 110). The control signal may notify or direct the user to a location, an appliance, or both, such as described above. In still various embodiments, transmitting the control signal may include transmitting the control signal to the appliance, or to a specific appliance, such as to permit or inhibit utilization by a user such as described above.

In some embodiments, the method 1000 includes at 1070 determining an activity status based on the plurality of utilization signals. The activity status may be based on the plurality of utilization signals corresponding to the plurality of appliances at a corresponding location. For instance, referring to FIG. 2, the utilization signal transmitted from each appliance (e.g., appliance 1141, 1142, etc.) at a location (e.g., location 102*a*) may be utilized to determine an activity status for the location (e.g., location 102*a*). A first activity status may correspond to a first location 102*a*, a second activity status may correspond to a second location 102*b*, a third activity status may correspond to a third location 102*c*, etc.

Determining the activity status may include at 1072 comparing the plurality of utilization signals indicative of appliance activity (e.g., present operation of the appliance) to signals indicative of appliance inactivity (e.g., present non-operation of the appliance).

The system 100 may include a reservation system at which a user may reserve an appliance for use (e.g., at a particular time or for a period of time). In such embodiments, determining the activity status may include at 1074 determining a ratio of reserved appliances to un-reserved appliances.

In various embodiments, the method 1000 includes at 1080 determining a quantity of devices (e.g., user interface device 110) within range of a network (e.g., network 132). In some embodiments, the method 1000 at 1080 determines a quantity of devices connected to, or connectable to (e.g., within range of) a network associated with the location of the plurality of appliances. The system 100 may be configured to detect devices connected to or within range of the network, and determine the quantity of such devices.

The method 1000 may include at 1082 determining a demand status based on comparing the quantity of devices within range of the network to the activity status. Determining the demand status may generate a demand ratio, such as to determine whether demand is low, high, or one or gradations therebetween.

In some embodiments, determining the demand status may include at 1084 comparing a device identifier to a time period. The device identifier may include an internet protocol (TP) address, a media access control (MAC) address, an Ethernet hardware address, a physical address, a burned-in address, a device name, or other numeric, alphabet, or combination of alpha-numeric characters associated with a device (e.g., user interface device 110). The time period may include a time stamp (e.g., discrete time in date, hours, minutes, seconds, or combinations thereof) or a range of time (e.g., within a 24-hour period, within a 12-hour period, within a several-hour period, within an hour, within a half-hour, within a quarter-hour, or within a tenth of an hour, etc.). Method 1000 may obtain and store device identifiers and time periods to determine correlations or regressions as may predict or estimate when a user may return to the location 102, such as to use a washing or drying appliance.

Embodiments of the method 1000 may include at 1090 generating a control signal based on the determined demand status. The method 1000 may include at 1092 transmitting the control signal based on the determine demand status. In various embodiments, transmitting the control signal includes transmitting the control signal to the device, such as described above, such as to direct a user to a particular location, appliance, or both. For instance, when the demand status is high, or when activity status is high, or both, the system 100 may generate and transmit a control signal directing a user to a lesser-utilized appliance (e.g., nominally utilized or under-utilized). The lesser-utilized appliance may be located at a different location 102 from the appliance, or may direct the user to a different appliance within the same location 102. The control signal may permit operation of the appliance at a reduced price, earlier wait time, or other incentive.

Various embodiments of the system 100 and method 1000 provided herein may allow an operator of a plurality of appliances 104, or pluralities of appliances 104 across pluralities of locations (e.g., 102*a*, 102*b*, 102*c*, etc.), to level-load utilization of the appliances. Such level-loading may increase durability of each appliance 104, or increase durability of the plurality of appliances 104, or allow for coordinated maintenance or down-time of the plurality of appliances 104, or portions of the plurality of appliances 104. For instance, level-loading may mitigate excessive wear or deterioration at a particular appliance among a plurality of appliances, or decrease a rate of wear or deterioration, such as compared to other appliances within the plurality of appliances 104 at a particular location, or the pluralities of appliances across a plurality of locations 102*a*, 102*b*, 102*c*, etc.

It should be appreciated that various embodiments of the system 100 and method 1000 may allow for level-loading of two or more appliances of similar type, such as, two or more laundry washing appliances, or two or more laundry drying appliances, etc. Accordingly, utilization may be balanced among the plurality of laundry washing appliances or laundry drying appliances, such as to promote utilization, usage, wear, or deterioration within a desired range, threshold, percentage, etc. of one another. The desired range may include, e.g., within 20% of one another, or within 15% of one another, or within 10% of one another, or within 5% of one another, or within 2% of one another, etc.

It should be appreciated that the present subject matter is not limited to any particular style, model, or configuration of laundry washing or drying appliance. Exemplary embodiments depicted and described herein are provided for illustrative purposes only. While certain quantities of appliances and locations are depicted herein, it should be appreciated that embodiments of the system 100 and method 1000 provided herein are not limited to any particular plurality of appliances or locations. Accordingly, embodiments provided herein may include, e.g., two or more washing appliances, two or more dryer appliances, two or more locations of the plurality of appliances, etc.

Further aspects of the present disclosure are provided in one or more of the following clauses:

1. A laundry appliance, the appliance including a controller configured to execute instructions that cause the appliance to perform operations, the operations including transmitting a utilization signal including a utilization rate of the appliance; obtaining a control signal based on an operation schedule, wherein the operation schedule determines whether the appliance is under-utilized, over-utilized, or nominally utilized based on the utilization signal; and adjusting operation of the appliance based on the control signal.

2. The laundry appliance of any one or more clauses herein, wherein adjusting operation of the appliance based on the control signal includes permitting or inhibiting operation of the appliance based on whether the appliance is under-utilized, over-utilized, or nominally utilized.

3. The laundry appliance of any one or more clauses herein, wherein the operation schedule determines whether the appliance is under-utilized, over-utilized, or nominally-utilized based on comparing the utilization rate to a utilization threshold.

4. The laundry appliance of any one or more clauses herein, wherein the control signal is a pricing signal, and wherein adjusting operation of the appliance based on the control signal includes adjusting pricing at the appliance based on the pricing signal.

5. The laundry appliance of any one or more clauses herein, wherein the control signal is a sensory visual signal configured to emit an audio or visual effect from the appliance.

6. The laundry appliance of any one or more clauses herein, the operations including transmitting a user control signal to a user interface device, the user control signal directing a user to operate the appliance based on the control signal.

7. A computer-implemented method for operating a plurality of appliances, the method including generating a utilization signal including a utilization rate corresponding to the plurality of appliances; generating an operation schedule of appliances based on the utilization rate; generating a control signal based on the operation schedule; and transmitting, to the plurality of appliances, the control signal to one or more of the plurality of appliances.

8. The method of any one or more clauses herein, wherein generating the operation schedule of appliances based on the utilization rate includes comparing the utilization rate to a threshold, wherein the threshold corresponds to usage at the appliance.

9. The method of any one or more clauses herein, the method including:
determining the threshold, wherein determining the threshold includes determining a baseline utilization rate from the utilization signal received from the plurality of appliances.

10. The method of any one or more clauses herein, wherein comparing the utilization rate to the threshold determines whether one or more of the plurality of appliances is under-utilized, over-utilized, or nominally-utilized.

11. The method of any one or more clauses herein, wherein the control signal includes a permissive signal or an inhibit signal, wherein the permissive signal is configured to allow operation of one or more of the plurality of appliances, and wherein the inhibit signal configured to disable operation of one or more of the plurality of appliances.

12. The method of any one or more clauses herein, wherein the control signal includes a pricing signal.

13. The method of any one or more clauses herein, wherein the pricing signal permits utilization of one or more of the plurality of appliances at a lower user cost than a baseline user cost.

14. The method of any one or more clauses herein, wherein the pricing signal permits utilization of one or more of the plurality of appliances at the lower user cost, wherein utilization at the lower user cost corresponds to determining one or more of the plurality of appliances is under-utilized.

15. The method of any one or more clauses herein, wherein the control signal is configured to direct a user to an appliance based on the utilization rate.

16. The method of any one or more clauses herein, wherein generating the operation schedule includes generating a priority schedule to arrange the plurality of appliances into an order of operation based on a ranking of utilization rates.

17. The method of any one or more clauses herein, the method including transmitting, to a user interface device, a user control signal indicative of one or more of the plurality of appliances for the user to operate.

18. The method of any one or more clauses herein, the method including transmitting, from the plurality of appliances, a utilization signal including a utilization rate of the appliance.

19. The method of any one or more clauses herein, the method including obtaining, at one or more of the plurality of appliances, a control signal based on an operation schedule.

20. The method of any one or more clauses herein, the method including adjusting operation of the appliance based on the control signal.

21. A computer-implemented method for operating pluralities of appliances, the method including generating a plurality of utilization signals including a utilization rate corresponding to a first plurality of appliances at a first location; determining an activity status based on the plurality of utilization signals of the first plurality of appliances at the first location; determining a demand status based on comparing the activity status to a quantity of user interface devices within range of a network; and generating a user control signal based on the demand status, wherein the user control signal corresponds to a second plurality of appliances at a second location.

22. The method of any one or more clauses herein, the method including transmitting the user control signal to a user interface device, wherein the user control signal directs a user to one or more of the second plurality of appliances.

23. The method of any one or more clauses herein, wherein determining the activity status includes comparing the plurality of utilization signals indicative of appliance activity to signals indicative of appliance inactivity.

24. The method of any one or more clauses herein, wherein determining the activity status includes determining a ratio of reserved appliances to un-reserved appliances.

25. The method of any one or more clauses herein, the method including determining a quantity of user interface devices within range of the network.
26. The method of any one or more clauses herein, wherein determining the quantity of user interface devices includes determining the quantity of user interface devices connected to or connectable to the network associated with the first location of the first plurality of appliances.
27. The method of any one or more clauses herein, wherein determining the demand status includes comparing a device identifier to a time period.
28. The method of any one or more clauses herein, the method including determining a correlation between the device identifier and the time period to estimate when a user may return to a location of a plurality of appliances.
29. The method of any one or more clauses herein, the method including generating an appliance control signal based on the demand status, wherein the appliance control signal corresponds to a second plurality of appliances at a second location.
30. The method of any one or more clauses herein, the method including transmitting the appliance control signal to one or more of the second plurality of appliances.
31. The method of any one or more clauses herein, wherein the appliance control signal includes a permissive signal or an inhibit signal, wherein the permissive signal is configured to allow operation of one or more of the second plurality of appliances, and wherein the inhibit signal configured to disable operation of one or more of the second plurality of appliances.
32. The method of any one or more clauses herein, wherein the appliance control signal includes a pricing signal.
33. The method of any one or more clauses herein, wherein the pricing signal permits utilization of one or more of the second plurality of appliances at a lower user cost than a baseline user cost.
34. The method of any one or more clauses herein, wherein the pricing signal permits utilization of one or more of the second plurality of appliances at the lower user cost, wherein utilization at the lower user cost corresponds to determining one or more of the second plurality of appliances is under-utilized.
35. A system of appliances, the system including a first plurality of appliances at a first location; a second plurality of appliances at a second location; a controller configured to execute operations, the operations including generating, at the first plurality of appliances, a plurality of utilization signals including a utilization rate corresponding to the first plurality of appliances; determining an activity status based on the plurality of utilization signals of the first plurality of appliances; determining a demand status based on comparing the activity status to a quantity of user interface devices within range of a network; and generating a user control signal based on the demand status.
36. The system of any one or more clauses herein, the operations including transmitting the user control signal to a user interface device, wherein the user control signal directs a user to one or more of the second plurality of appliances.
37. The system of any one or more clauses herein, wherein determining the activity status includes comparing the plurality of utilization signals indicative of appliance activity to signals indicative of appliance inactivity.
38. The system of any one or more clauses herein, wherein determining the activity status includes determining a ratio of reserved appliances to un-reserved appliances.
39. The system of any one or more clauses herein, the operations including determining a quantity of user interface devices within range of the network, wherein determining the quantity of user interface devices includes determining the quantity of user interface devices connected to or connectable to the network associated with the first location of the first plurality of appliances.
40. The system of any one or more clauses herein, the operations including comparing a device identifier to a time period; and determining a correlation between the device identifier and the time period to estimate when a user may return to a location of a plurality of appliances.
41. A system of appliances configured to execute the method of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A computer-implemented method for operating pluralities of appliances, the method comprising:
generating a plurality of utilization signals comprising a utilization rate corresponding to a first plurality of appliances at a first location;
determining an activity status based on the plurality of utilization signals of the first plurality of appliances at the first location;
determining a demand status based on comparing the activity status to a quantity of user interface devices within range of a network;
generating a user control signal based on the demand status, wherein the user control signal corresponds to a second plurality of appliances at a second location;
generating an appliance control signal based on the demand status, wherein the appliance control signal corresponds to a second plurality of appliances at a second location; and
transmitting the appliance control signal to one or more of the second plurality of appliances, wherein the appliance control signal comprises a permissive signal or an inhibit signal, wherein the permissive signal is configured to allow operation of one or more of the second plurality of appliances, and wherein the inhibit signal configured to disable operation of one or more of the second plurality of appliances.
2. The method of claim 1, the method comprising:
transmitting the user control signal to a user interface device, wherein the user control signal directs a user to one or more of the second plurality of appliances.

3. The method of claim 1, wherein determining the activity status comprises:
comparing the plurality of utilization signals indicative of appliance activity to signals indicative of appliance inactivity.

4. The method of claim 1, wherein determining the activity status comprises:
determining a ratio of reserved appliances to un-reserved appliances.

5. The method of claim 1, the method comprising:
determining a quantity of user interface devices within range of the network.

6. The method of claim 5, wherein determining the quantity of user interface devices comprises determining the quantity of user interface devices connected to or connectable to the network associated with the first location of the first plurality of appliances.

7. The method of claim 1, wherein determining the demand status comprises:
comparing a device identifier to a time period.

8. The method of claim 7, the method comprising:
determining a correlation between the device identifier and the time period to estimate when a user may return to a location of a plurality of appliances.

9. The method of claim 1, wherein the appliance control signal comprises a pricing signal.

10. The method of claim 9, wherein the pricing signal permits utilization of one or more of the second plurality of appliances at a lower user cost than a baseline user cost.

11. The method of claim 10, wherein the pricing signal permits utilization of one or more of the second plurality of appliances at the lower user cost, wherein utilization at the lower user cost corresponds to determining one or more of the second plurality of appliances is under-utilized.

12. A system of appliances, the system comprising:
a first plurality of appliances at a first location;
a second plurality of appliances at a second location;
a controller configured to execute operations, the operations comprising:
generating, at the first plurality of appliances, a plurality of utilization signals comprising a utilization rate corresponding to the first plurality of appliances;
determining an activity status based on the plurality of utilization signals of the first plurality of appliances;
determining a demand status based on comparing the activity status to a quantity of user interface devices within range of a network;
generating a user control signal based on the demand status;
generating an appliance control signal based on the demand status, wherein the appliance control signal corresponds to a second plurality of appliances at a second location; and
transmitting the appliance control signal to one or more of the second plurality of appliances, wherein the appliance control signal comprises a permissive signal or an inhibit signal, wherein the permissive signal is configured to allow operation of one or more of the second plurality of appliances, and wherein the inhibit signal configured to disable operation of one or more of the second plurality of appliances.

13. The system of claim 12, the operations comprising:
transmitting the user control signal to a user interface device, wherein the user control signal directs a user to one or more of the second plurality of appliances.

14. The system of claim 12, wherein determining the activity status comprises:
comparing the plurality of utilization signals indicative of appliance activity to signals indicative of appliance inactivity.

15. The system of claim 12, wherein determining the activity status comprises:
determining a ratio of reserved appliances to un-reserved appliances.

16. The system of claim 12, the operations comprising:
determining a quantity of user interface devices within range of the network, wherein determining the quantity of user interface devices comprises determining the quantity of user interface devices connected to or connectable to the network associated with the first location of the first plurality of appliances.

17. The system of claim 12, the operations comprising:
comparing a device identifier to a time period; and
determining a correlation between the device identifier and the time period to estimate when a user may return to a location of a plurality of appliances.

* * * * *